United States Patent
Ploss et al.

(10) Patent No.: US 10,746,578 B2
(45) Date of Patent: Aug. 18, 2020

(54) ULTRASONIC FLOW MEASURING DEVICE WITH A RECTANGULAR CROSS-SECTION PASSAGE HAVING RECESSES IN TWO SIDEWALLS OTHER THAN THE SIDEWALLS IN WHICH THE TRANSDUCERS ARE LOCATED

(71) Applicant: DIEHL METERING GMBH, Ansbach (DE)

(72) Inventors: Peter Ploss, Bayreuth (DE); Michael Mayle, Ansbach (DE); Andreas Benkert, Ansbach (DE)

(73) Assignee: Deihl Metering GmbH, Ansbach (DE)

( * ) Notice: Subject to any disclaimer, the term of this patent is extended or adjusted under 35 U.S.C. 154(b) by 33 days.

(21) Appl. No.: 16/148,309

(22) Filed: Oct. 1, 2018

(65) Prior Publication Data
US 2019/0113375 A1  Apr. 18, 2019

(30) Foreign Application Priority Data
Oct. 12, 2017 (DE) ........................ 10 2017 009 462

(51) Int. Cl.
*G01F 1/66* (2006.01)
(52) U.S. Cl.
CPC .................................... *G01F 1/662* (2013.01)
(58) Field of Classification Search
None
See application file for complete search history.

(56) References Cited

U.S. PATENT DOCUMENTS 3,906,791 A * 9/1975 Lynnworth ............... G01F 1/66
  73/861.29
4,735,097 A   4/1988 Lynnworth
  (Continued)

FOREIGN PATENT DOCUMENTS

DE  102013101950 A1  11/2013
DE  102015008146 A1  12/2016
(Continued)

OTHER PUBLICATIONS

Lindner, Gerhard: Topical Review "Sensors and actuators based on surface acoustic waves propagating along solid-liquid interfaces". Institute of Sensor and Actuator Technology, Coburg University of Applied Sciences.

*Primary Examiner* — Harshad R Patel
(74) *Attorney, Agent, or Firm* — Laurence A. Greenberg; Werner H. Stemer; Ralph E. Locher

(57) ABSTRACT

A measuring device for determining a fluid variable relating to a fluid or fluid flow includes a control device, a measuring tube receiving the fluid or fluid flow, and oscillation transducers spaced apart on the measuring tube. At least one oscillation transducer is drivable by the control device to excite a wave conducted through at least one side wall of the measuring tube, the conducted wave exciting compression oscillations of the fluid conducted through the fluid to the other oscillation transducer and recorded there by the control device to determine measurement data. The fluid variable can be determined by the control device as a function of the measurement data. At least one further side wall of the measuring tube has at least one recess extending in a flow direction and increasing a flow cross section of the measuring tube. A method for determining a fluid variable is also provided.

9 Claims, 2 Drawing Sheets

(56) References Cited

U.S. PATENT DOCUMENTS

| | | | |
|---|---|---|---|
| 7,819,022 B2 | 10/2010 | Hope | |
| 8,955,392 B2* | 2/2015 | Liu | G01F 1/66 |
| | | | 73/861.28 |
| 2011/0132102 A1* | 6/2011 | Ueberschlag | G01F 1/662 |
| | | | 73/861.27 |
| 2011/0271769 A1 | 11/2011 | Kippersund et al. | |
| 2014/0260668 A1 | 9/2014 | Liu et al. | |
| 2016/0377468 A1* | 12/2016 | Satou | G01F 1/662 |
| | | | 73/861.27 |
| 2018/0120139 A1 | 5/2018 | Sonnenberg | |

FOREIGN PATENT DOCUMENTS

| | | | |
|---|---|---|---|
| EP | 1701140 A1 | 9/2006 | |
| WO | 2016206773 A1 | 12/2016 | |

\* cited by examiner

ULTRASONIC FLOW MEASURING DEVICE WITH A RECTANGULAR CROSS-SECTION PASSAGE HAVING RECESSES IN TWO SIDEWALLS OTHER THAN THE SIDEWALLS IN WHICH THE TRANSDUCERS ARE LOCATED

CROSS-REFERENCE TO RELATED APPLICATION

This application claims the priority, under 35 U.S.C. § 119, of German Patent Application DE 10 2017 009 462.4, filed Oct. 12, 2017; the prior application is herewith incorporated by reference in its entirety.

BACKGROUND OF THE INVENTION

Field of the Invention

The invention relates to a measuring device for determining a fluid variable relating to a fluid and/or a fluid flow of the fluid, which includes a control device, a measuring tube which receives the fluid and/or through which the fluid flows, and a first and a second oscillation transducer which are disposed at a distance from one another on the measuring tube, the first and/or second oscillation transducer can be driven by the control device in order to excite a wave which is conducted through a side wall, or a respective side wall, of the measuring tube, the conducted wave excites compression oscillations of the fluid, which oscillations can be conducted through the fluid to the respective other oscillation transducer and can be recorded there by the control device in order to determine measurement data, and the fluid variable can be determined by the control device as a function of the measurement data. The invention furthermore relates to a method for determining a fluid variable.

One possibility for measuring a flow through a measuring tube involves ultrasonic meters. At least one ultrasound transducer is used therein in order to introduce an ultrasound wave into the fluid flowing through the measuring tube, with that wave being conducted on a straight path or after multiple reflections at walls or special reflection elements to a second ultrasound transducer. A flow rate through the measuring tube can be determined from the time of flight of the ultrasound wave between the ultrasound transducers, or from a time-of-flight difference in the event of interchanging of the transmitter and receiver.

In the case of direct coupling of the ultrasound waves into the fluid, typically only a fraction of the volume flowed through between the ultrasound transducers is passed through by the incident ultrasound waves, so that only information from that subvolume can be used. That may lead to a strong dependency of the measurement variable on the flow profile, with the flow profile being susceptible to variation as a function of the flow rate or other factors. That flow profile dependency can typically only be compensated for partially, so that measurement errors may result from the flow profile being incompletely taken into account.

That region of the volume between the ultrasound transducers, which is taken into account, may be increased when the fluid is not excited directly, but instead conducted waves, in particular Lamb waves, are initially excited in a side wall of the measuring tube, and they in turn excite the fluid in compression oscillations. Approaches for coupling conducted waves into a wall of the measuring tube are known, for example, from U.S. Pat. No. 4,735,097 A and an article by G. Lindner, entitled "Sensors and actuators based on surface acoustic waves propagating along solid-liquid interfaces," in J. Phys. D: Appl. Phys. 41 (2008) 123002.

Flow meters and other measuring devices for measuring fluid properties should typically allow a high measurement accuracy over a wide range of flow rates. In the region of low flow quantities, or flow rates, the measurement accuracy is typically limited by the time resolution of the measurement of the signal times of flight. Although the flow rate can be increased, and the problem of the time resolution therefore reduced, by reducing the inner diameter of the measuring tube by a corresponding measurement insert, that nevertheless results in a greater construction outlay for the measuring device and a higher pressure loss at the measuring device. Although the time resolution may potentially also be improved by improving the sensors or electronics of the measuring device, that nevertheless requires a high technical outlay.

SUMMARY OF THE INVENTION

It is accordingly an object of the invention to provide a measuring device and a method for determining a fluid variable, which overcome the hereinafore-mentioned disadvantages of the heretofore-known devices and methods of this general type, which improve a measurement accuracy for fluid variables, in particular for a fluid variable relating to throughput, for low flow quantities and which require the least possible technical outlay.

With the foregoing and other objects in view there is provided, in accordance with the invention, a measuring device for determining a fluid variable relating to a fluid and/or a fluid flow of the fluid, including a control device, a measuring tube which receives the fluid and/or through which the fluid flows, and a first and a second oscillation transducer which are disposed at a distance from one another on the measuring tube, the first and/or second oscillation transducer can be driven by the control device in order to excite a wave which is conducted through a side wall, or a respective side wall, of the measuring tube, the conducted wave excites compression oscillations of the fluid, which oscillations can be conducted through the fluid to the respective other oscillation transducer and can be recorded there by the control device in order to determine measurement data, the fluid variable can be determined by the control device as a function of the measurement data, and at least one further side wall of the measuring tube has at least one recess which extends in the flow direction and increases the flow cross section of the measuring tube.

Through the use of the recess, which may also be referred to as a groove, furrow or excrescence, a kind of secondary channel is formed, through which a part of the fluid conveyed by the measuring tube can flow. The distribution of the fluid flow between the region of the recess, or recesses, and the region which is located outside the recesses, depends on the flow rate. Since the dimensions of the recess may be relatively small as compared with the overall dimensions of the measuring tube, that part of the fluid which is conveyed in the region of the recess interacts more strongly with the walls of the measuring tube than that part of the fluid which is conveyed outside the recesses, and in particular close to the center of the tube. If the flow through the measuring tube is small, the majority of this flow is conveyed close to the center of the tube, and therefore outside the recess or recesses. With an increasing throughput, particularly in the case of a transition from the laminar to the turbulent range, the flow rate in the vicinity of the tube walls increases relative to that at the center of the tube. This also applies, in particular, in the region of the recess or recesses, so that the contribution of the recess or recesses to the fluid transport increases. The ratio of the flow quantity per unit time through the recess, or the recesses, to the flow quantity per unit time through the region outside the recess, or recesses, therefore increases with an increasing total flow quantity.

If the measurement is then carried out in such a way that the compression waves, in particular the ultrasound waves, are conducted substantially only through the region of the measuring tube which is located outside the recesses, then almost only that part of the fluid flow which flows in the region outside the recess or the recesses is taken into account. In the case of low flow quantities, as explained above, almost all of the fluid transport takes place in this region. If the flow quantity is increased greatly, a part of the fluid is conveyed through the recesses, and therefore past the region taken into account in the scope of the measurement. The effect of this is that the flow quantity per unit time is no longer proportional to the measured flow rate, but that in the case of low flow quantities a rate elevated relative thereto is measured. In this way, the above-described time resolution problems in the case of low flow quantities can be reduced or avoided.

The measuring tube may be formed by a plurality of side walls disposed at an angle to one another. The basic shape of the measuring tube may, in particular, be rectangular. The inner faces of the side walls may, apart from the region of the recess, substantially be flat or have a constant curvature without a change of sign. The recess may be formed in such a way that the curvature of the inner face in the circumferential direction of the measuring tube changes its sign at least twice in order to form a recess.

Measurements may be carried out on a fluid flow flowing through the measuring tube, but also on a fluid which is stationary in the measuring tube. The measuring device may also have more than two oscillation transducers. The oscillation transducers may be disposed on the same side wall or on different, in particular opposite, side walls. At least one further oscillation transducer may, for example, be used so that oscillations emitted by the first and/or the second oscillation transducer are additionally recorded by the further oscillation transducer, for example in order to take into account different propagation paths or to validate measurement data.

The use of oscillation transport in order to record fluid properties is known in principle from the prior art. In ultrasonic meters, for example, time-of-flight differences of a time of flight of an oscillation between a first and a second ultrasound transducer and vice versa are often recorded and a flow rate can be determined therefrom. vlt is, however, also possible to obtain other measurement data in order to determine fluid properties. For example, a signal amplitude at the receiving oscillation transducer may be evaluated in order to record an attenuation of the oscillation during the transport through the fluid. Amplitudes may also be evaluated frequency-dependently, and absolute or relative amplitudes of particular spectral ranges may be evaluated in order to record a spectrally different attenuation behavior in the fluid. Phase angles of different frequency bands may also be evaluated, in order for example to obtain information about the dispersion behavior of the measurement path, in particular the dispersion behavior in the fluid and/or in the measuring tube. As an alternative or in addition, changes in the spectral composition or the amplitude as a function of time, for example within a measurement pulse, may also be evaluated.

By evaluation of these variables, a flow rate and/or a flow volume and/or a density, temperature and/or viscosity of the fluid may for example be determined as fluid variables. In addition or as an alternative, for example, a speed of sound in the fluid and/or a composition of the fluid, for example a mixing ratio of different components, may be determined. Various approaches for obtaining those fluid variables from the measurement variables explained above are known in the prior art, and will therefore not be presented in detail. For example, relationships between one or more measurement variables and the fluid variable may be determined empirically, and for example a look-up table or a corresponding formula may be used in order to determine the fluid variable.

Excitation of the conducted waves, in particular substantially pure-mode excitation of Lamb waves, is possible in a variety of ways. For example, the first and/or the second oscillation transducer may be planar, in particular piezoelectric, oscillation transducers which are disposed parallel to the side wall. In order to achieve mode selectivity of the excitation in this case, excitation may be carried out at separated excitation distances. Mode selectivity is achieved by adapting the excitation structure to a desired wavelength. As an alternative, it is for example possible for the oscillation transducer to be an interdigital transducer, which has an electrode structure in which oppositely poled electrodes engage in one another in the manner of fingers. By tuning the separations of the electrodes engaging in one another, the excitation of oscillations with particular wavelengths may be promoted or suppressed.

The first and the second oscillation transducers may be disposed on the same side wall, and this side wall and an opposite side wall may have planar and/or mutually parallel inner faces and/or constant wall thicknesses at least in a measurement section located between the first and second oscillation transducers, or the first and second oscillation transducers may be disposed on mutually opposite side walls, which may have planar and/or mutually parallel inner faces and/or constant wall thicknesses at least in the measurement section. The side wall, or the side walls, on which the oscillation transducers are disposed may therefore be configured in such a way that unperturbed excitation or conduction of the conducted wave in the respective side wall is made possible. The recess, or the recesses, may be provided only in side walls on which none of the oscillation transducers is disposed.

The inner face of the further side wall may have a constant wall thickness outside the at least one recess at least in the or a measurement section located between the first and the second oscillation transducer, and/or its inner face may be planar there or have a constant curvature without a change of sign. Through the use of the side wall sections outside the recess or recesses, it is therefore possible to define a regular main flow volume, which may for example be rectangular, inside which the measurement is carried out and through which almost all of the fluid flow is conveyed in the case of low flow rates.

The first and the second oscillation transducer may be disposed on the same side wall, and the inner faces of this side wall and of an opposite side wall may span a main flow volume, and/or the first and second oscillation transducers may be disposed on mutually opposite side walls, the inner faces of which span the main flow volume, with the at least one recess being located outside the main flow volume and forming a respective secondary flow volume. As already explained in the introduction, in the case of low flow rates almost all of the fluid flow is conveyed through the main flow volume, since the flow rate in the recesses is slowed significantly because of the greater proximity of the fluid to the wall. With an increasing flow rate, the fluid flow is distributed between the main flow volume and the secondary flow volume or volumes. As already explained, the effect of this is that the measured flow rate decreases with a decreasing flow volume more slowly as compared with a measuring tube which does not have a corresponding recess, so that a measurement accuracy in the case of low flow volumes can be increased. Yet since there is a unique relationship between the measured flow rate and the flow volume, and only the functional dependency of the flow rate on the flow volume is modified by providing the recesses, an accuracy of a flow quantity measurement can be improved overall.

The side wall, or the side walls, on which the first and/or the second oscillation sound transducer are disposed may be at an angle, in particular perpendicular, to the further side wall. The measuring tube may have a rectangular outer cross section and/or an inner cross section which is rectangular, apart from the at least one recess, at least in the or a measurement section located between the first and the second oscillation transducer. In this case it is possible that the corners of the inner and/or outer cross sections are rounded for technical production reasons or in order to improve the flow properties. In the case of a rectangular measuring tube, conducted waves can be conducted reliably in individual side walls, and a relatively large part of the measuring tube cross section may be passed through by ultrasound waves for measurement purposes, so that a dependency of the measurement values on the flow profile can be reduced.

The recess may have a planar or curved, in particular circle segment-shaped, recess bottom and recess walls extending at an angle to the recess bottom. Resulting corners in the transition region with the section of the side wall outside the recess, and between recess bottoms and recess wall, may be rounded. This may be used for simpler production of the measuring tube and/or in order to improve the flow properties in the measuring tube.

In the longitudinal direction of the measuring tube, the recess may extend at least over the or a measuring tube section between the first and the second oscillation transducer. Preferably, the recess extends in the longitudinal direction beyond the first and/or second oscillation transducer. The cross-sectional profile of the recess may be substantially constant over the entire length of the recess.

The further side wall may have at least two separate recesses. As explained above, the improvement of the measurement accuracy in the case of low flow quantities in the measuring device according to the invention is substantially based on a fluid flow being conveyed along inside the recess close to the wall of the measuring tube, or being partially enclosed by the wall with a relatively narrow distance. The recesses should therefore preferably not be selected to be too large. At the same time, however, it may be desirable to provide a relatively large additional cross-sectional area through the recesses. This may be achieved by providing a plurality of recesses on a side wall.

In addition or as an alternative, it is possible for the measuring device to have least two of the further side walls, each of which has at least one respective recess. In this way as well, the additional flow cross section provided by the recesses can be increased.

With the objects of the invention in view, there is concomitantly provided a method for determining a fluid variable relating to a fluid and/or a fluid flow of the fluid, which comprises providing a measuring device, a control device, a measuring tube which receives the fluid and/or through which the fluid flows, and a first and a second oscillation transducer which are disposed at a distance from one another on the measuring tube, the first and/or second oscillation transducer being driven by the control device in order to excite a wave which is conducted through a side wall, or a respective side wall, of the measuring tube, the conducted wave exciting compression oscillations of the fluid, which oscillations are conducted through the fluid to the respective other oscillation transducer and are recorded there by the control device in order to determine measurement data, the fluid variable being determined by the control device as a function of the measurement data, and at least one further side wall of the measuring tube having at least one recess which extends in the flow direction and by which the flow cross section of the measuring tube is increased.

The method according to the invention may be refined with the features explained in relation to the measuring device according to the invention, with the advantages mentioned there, and vice versa.

Other features which are considered as characteristic for the invention are set forth in the appended claims.

Although the invention is illustrated and described herein as embodied in a measuring device and a method for determining a fluid variable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
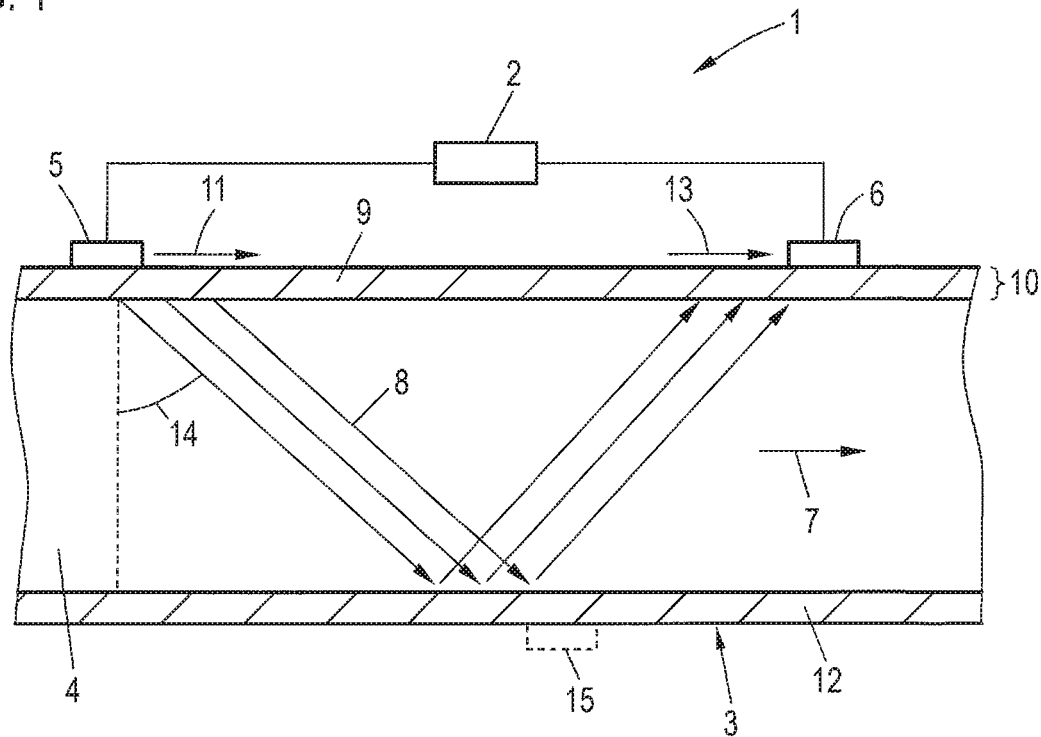
FIG. 1 is a diagrammatic, longitudinal-sectional view showing the basic structure and the measurement principle of an exemplary embodiment of a measuring device according to the invention, with which an exemplary embodiment of the method according to the invention can be carried out.

Referring now to the figures of the drawings in detail and first, particularly, to FIG. 1 thereof, there is seen a measuring device 1 for determining a fluid variable relating to a fluid and/or a fluid flow. The fluid in this case is conveyed in a direction shown by an arrow 7 through an internal space 4 of a measuring tube 3. In order to determine the fluid variable, in particular a flow volume, a time-of-flight difference between the times of flight from a first oscillation transducer 5 to a second oscillation transducer 6, and vice versa, may be determined by a control device 2. In this case, use is made of the fact that this time of flight depends on a velocity component of the fluid parallel to a propagation direction of an ultrasound ray 8 through the fluid. It is therefore possible to determine a flow rate from this time-of-flight difference, in which the flow rate is determined over the path of the respective ultrasound ray 8, in the direction of the respective ultrasound ray 8, and therefore approximately an averaged flow rate in the volume through which the ultrasound beam 8 passes.

On one hand, in order to make it possible to place the ultrasound transducers 5, 6 outside the measuring tube, and on the other hand, in order to reduce a sensitivity in relation to different flow rates at different positions of the flow profile, an ultrasound ray 8, i.e. a pressure wave, is not induced directly in the fluid by the first oscillation transducer 5. Instead, a conducted wave, namely a Lamb wave, is excited in a side wall 9 by the ultrasound transducer 5. Such waves may be excited when the thickness of the side wall is comparable to the wavelength of the transverse wave in the solid, which is given by the ratio of the speed of sound of the transverse wave in the solid and the excited frequency.

The conducted wave excited in the side wall 9 by the oscillation transducer 5 is represented schematically by an arrow 11. Compression oscillations of the fluid are excited by the conducted wave, and these are emitted into the fluid in the entire propagation path of the conducted waves. This is represented schematically by the ultrasound rays 8 offset relative to one another in the flow direction. The emitted ultrasound rays 8 are reflected at the opposite side wall 12 and conducted through the fluid back to the side wall 9. There, the incident ultrasound rays 8 again excite a conducted wave in the side wall 9, which is represented schematically by an arrow 13 and can be recorded by the oscillation transducer 6 in order to determine the time of flight. As an alternative, recording of the oscillations could be carried out by using an oscillation transducer 15 which is disposed on the side wall 12.

In the example shown, the ultrasound rays 8 are not reflected, or are reflected only once, on their way to the oscillation transducers 6, 15. It would of course be possible to use a longer measurement path, with the ultrasound rays 8 being reflected several times at the side walls 9, 12.

In order to simplify evaluation of the measurement data, the ultrasound rays 8 should preferably be emitted into the fluid at a single Rayleigh angle 14. This may be achieved by carrying out maximally pure-mode excitation of the side wall 9, so that a Lamb wave that has substantially only a single mode is excited. This may, for example, be achieved by the natural modes of the oscillation transducers 5, 6 being tuned to the mode to be excited by excitation being carried out in a plurality of excitation regions by the oscillation transducers 5, 6, with the distances and/or phases of the excitation being tuned to the mode to be excited, by using an interdigital transducer with an electrode structure which is tuned to the mode to be excited, or the like.

In the case of very low flow quantities, the problem may arise in the described measurement that the average flow rate in the region through which the ultrasound rays 8 pass is very low, so that the time-of-flight difference between a time of flight from the first oscillation transducer 5 to the second oscillation transducer 6, and vice versa, is very small, and therefore often can no longer be measured with sufficient exactness. In order to measure relatively small flow quantities, the diameter of the measuring tube would therefore have to be reduced, or the measuring tube would have to be artificially narrowed in the measurement region, for example by a corresponding insert. This, however, leads to an increase of the pressure drop at the measuring device, which is often not desirable.

Instead of that, use is therefore made of the fact that a flow profile may have different shapes as a function of the flow rate, and therefore also as a function of the flow quantity, when the measuring tube 3 is correspondingly shaped. This will be explained below with reference to FIGS. 2. and 3.

The measuring tube 3 is formed by side walls 9, 12, 16 and 17, which are substantially orthogonal to one another so that a substantially rectangular flow cross section is formed. This, however, is modified by providing recesses 18-21 in the side walls 16, 17, i.e. in those side walls on which no oscillation transducers 5, 6, 15 are disposed and which do not lie opposite such walls, and are therefore not relevant for the conduction of the ultrasound rays 8. These recesses are not represented in FIG. 1 for reasons of clarity. The volume of the measuring tube is therefore composed of a main flow volume, which is spanned by the inner faces of the side walls 9, 12, and a plurality of secondary flow volumes, which are respectively formed by the recesses 18-21. In the secondary flow volumes, i.e. in the recesses 18-21, in the case of low flow rates, the flow rate is significantly less than in the main flow volume, since the fluid in the secondary flow volume is braked by the close proximity to the side walls 16, 17. In the case of low flow rates, fluid transport therefore takes place for the most part in a region 22 around the center of the tube, in which the fluid has relatively high speeds and which is located relatively far away from the side walls 9, 12, 16, 17. The region 22 marks the section of the flow cross section outside of which the flow rate is at least 20% less than at the center of the tube. With an increasingly high throughput, this region widens to a region 23, which also penetrates into the secondary flow volume and therefore into the recesses 18-21. The widening of the region as shown may correspond to an increase in the flow of from for example 16 l/h to 4,000 l/h.

Figure 2:
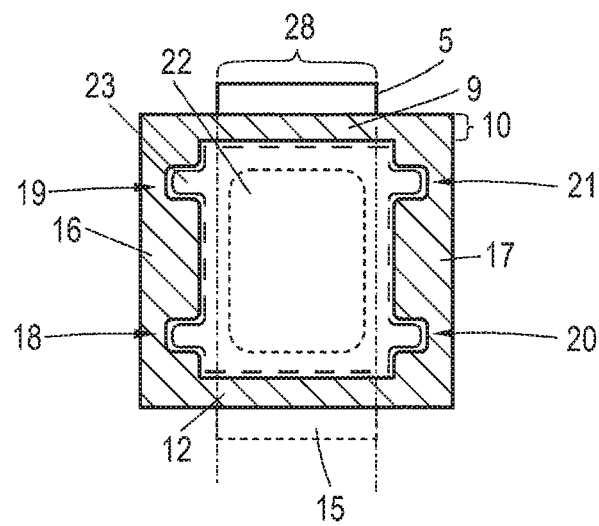
FIGS. 2 and 3 are sectional views of a measuring tube of the measuring device shown in FIG. 1.

As can be seen in FIG. 2, the region 22, inside of which the majority of the fluid transport takes place in the case of low flow quantities, is located fully inside a measurement-relevant region 28 through which the ultrasound rays 8 pass. The region 23, which performs a majority of the fluid transport in the case of high throughputs, does however lie partly outside the measurement-relevant region 28, so that a relatively large proportion of the fluid is conveyed past the measurement-relevant region 28. As compared with a measuring tube that does not have the recesses 18-21, in the case of relatively low throughputs approximately the same flow rate is therefore measured, while in the case of high throughputs a low flow rate is measured, or there is a low pressure drop at the measurement tube. By providing the recesses 18-21, the measurement region in which on one hand a sufficient resolution is achieved in the case of low throughputs, and on the other hand there is not an excessively great pressure drop at the measuring tube 3 in the case of high throughputs, can thus be widened relative to a purely rectangular shape of the measuring tube 3.

Figure 4:
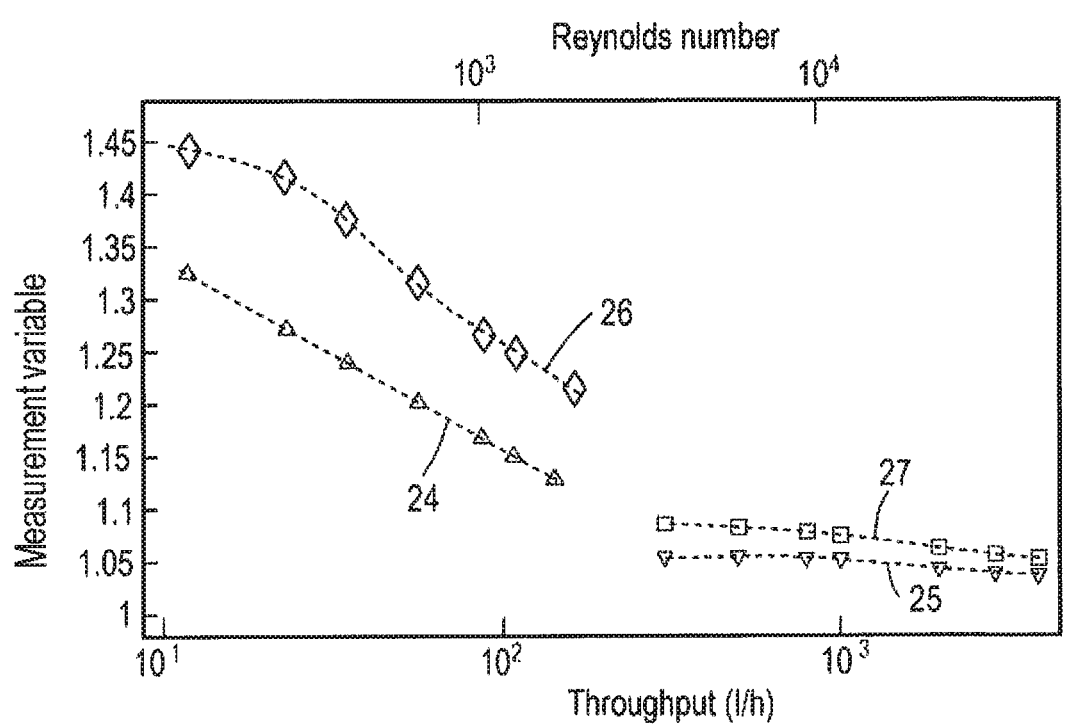
FIG. 4 is a diagram showing the ratio of a flow rate which is determined to an average flow rate in the entire measurement region for the exemplary embodiment shown in FIGS. 1 to 3 and a comparative measuring tube.

In order to illustrate this effect, FIG. 4 shows the ratio between the average flow rate in the measurement-relevant region 28, which substantially corresponds to the measured flow rate, and the average flow rate in the entire tube cross section, on one hand for the measuring tube 3 used in the exemplary embodiment discussed above, and on the other hand for a comparative measuring tube which has a rectangular flow cross section. In this case, curves or lines 26, 27 show simulations for the measuring tube 3 and curves or lines 24, 25 show simulations for the comparative measuring tube. The lines 24, 26 relate to the laminar flow range, and the lines 25, 27 to the turbulent flow range. The factor represented corresponds to the ratio of the flow rate in the measurement-relevant region 28 and the average flow rate in the entire tube cross section.

It can be clearly seen from FIG. 4 that this factor for the measuring tube 3 with the recesses provided therein, in particular for low flow rates, is significantly higher than for the comparative measuring tube. Yet since the average flow rate in the entire tube cross section is proportional to the flow quantity, higher flow rates are measured in the measuring tube 3 with the recesses 18-21 provided in the side walls 16, 17 for the same throughput, particularly in the case of low flow quantities. For this reason, the limit of the time resolution, and therefore the velocity resolution of the measuring device, for the same measurement electronics being used, is not reached until significantly lower throughputs, so that use of the measuring tube 3 allows more accurate measurements in the case of lower throughputs.

Figure 3:
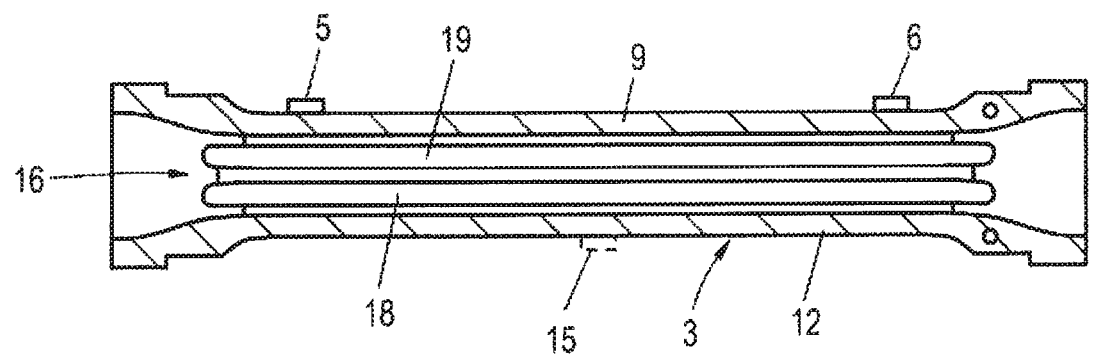

The increase of the factor plotted in FIG. 4 toward low flow quantities may also be referred to as the hydrodynamic elevation H of the measured flow rate. Such a variable may be calculated by determining the ratio of the factor represented in FIG. 4 for different throughputs. If this hydrodynamic elevation factor H between two throughputs, for example between a throughput of 16 l/h and 4,000 l/h, is determined both for the measuring tube 3 and for the comparative measuring tube, an improvement factor may be calculated as a ratio of the hydrodynamic elevation factors, which describes to what extent the hydrodynamic elevation is improved for the proposed measuring tube 3 as compared with a rectangular comparative measuring tube. Simulations have given an improvement factor of 1.08 for a measuring tube with the structure represented in FIGS. 2 and 3 compared with a correspondingly rectangular comparative measuring tube, i.e. a significant elevation of the measured rates in the case of low throughputs, so that these can be recorded more accurately.

The following is a summary list of reference numerals and the corresponding structure used in the above description of the invention. List of Reference Numerals:

1 measuring device
2 control device
3 measuring tube
4 internal space
5 oscillation transducer
6 oscillation transducer
7 arrow
8 ultrasound ray
9 side wall
10 wall thickness
11 arrow
12 side wall
13 arrow
14 Rayleigh angle
15 oscillation transducer
16 side wall
17 side wall
18 recess
19 recess
20 recess
21 recess
22 region
23 region
24 line
25 line
26 line
27 line
28 region

The invention claimed is:

1. A measuring device for determining a fluid variable relating to at least one of a fluid or a flow of the fluid, the measuring device comprising:
a measuring tube for at least one receiving the fluid or conducting the flow of the fluid through said measuring tube in a flow direction, said measuring tube having a flow cross section, side walls including one side wall, an opposite side wall located opposite said one side wall, a further side wall, and a further opposite side wall located opposite said further side wall;
first and second oscillation transducers disposed at a distance from one another on said measuring tube;
at least one wall selected from the group consisting of said further side wall and said further opposite side wall having at least one recess extending in said flow direction, said at least one recess increasing said flow cross section of said measuring tube, wherein said measuring tube has a rectangular flow cross section apart from said at least one recess at least in at least one measurement section located between said first and second oscillation transducers;
a control device for driving at least one of said oscillation transducers to excite a wave being conducted through at least one of said side walls of said measuring tube, said conducted wave exciting compression oscillations of the fluid to be conducted through the fluid to a further of said oscillation transducers;
said control device being configured to record said compression oscillations at an oscillation transducer selected from the group consisting of said first oscillation transducer and said second oscillation transducer to determine measurement data;
said control device being configured to determine the fluid variable as a function of said measurement data;
said one side wall and said opposite side wall having inner faces spanning a main flow volume; and
said first and second oscillation transducers both being disposed on said one side wall or one of said first and second oscillation transducers being disposed on said one side wall and another one of said first and second oscillation transducers being disposed on said opposite side wall;
said at least one recess being located outside said main flow volume and forming a respective secondary flow volume,
wherein said at least one recess is provided only in at least one wall selected from the group consisting of said further side wall on which none of said oscillation transducers is disposed and said further opposite side wall on which none of said oscillation transducers is disposed.

2. The measuring device according to claim 1, wherein:
said first and second oscillation transducers are disposed on a wall selected from the group consisting of said one side wall and said opposite side wall, and a different wall selected from the group consisting of said one side wall and said opposite side wall has at least one of planar or mutually parallel inner faces or constant wall thicknesses at least in a measurement section located between said first and second oscillation transducers, or
a transducer selected from the group consisting of said first oscillation transducer and said second oscillation transducer is disposed on said one side wall, another transducer selected from the group consisting of said first oscillation transducer and said second oscillation transducer is disposed on said opposite side wall, said one side wall and said opposite side wall have at least one of planar or mutually parallel inner faces or constant wall thicknesses at least in said measurement section.

3. The measuring device according to claim 1, wherein at least one wall selected from the group consisting of said further side wall and said further opposite side wall has at least one of:
 a constant wall thickness outside said at least one recess at least in at least one measurement section located between said first and second oscillation transducers, or
 an inner face being planar in said at least one measurement section or having a constant curvature without a change of sign.

4. The measuring device according to claim 1, wherein at least one wall selected from the group consisting of said one side wall and said opposite side wall, on which at least one of said first and second oscillation transducers is disposed, is oriented at an angle relative to said further side wall.

5. The measuring device according to claim 1, wherein said measuring tube has a rectangular outer cross section, at least in at least one measurement section located between said first and second oscillation transducers.

6. The measuring device according to claim 1, wherein said at least one recess has a planar or curved or circle segment-shaped recess bottom and recess walls extending at an angle relative to said recess bottom.

7. The measuring device according to claim 1, wherein said at least one recess includes at least two separate recesses in said further side wall.

8. The measuring device according to claim 1, wherein said further side wall and said further opposite side wall each have at least one respective recess.

9. A method for determining a fluid variable relating to at least one of a fluid or a flow of the fluid with a measuring device, the method comprising the following steps:
 providing a measuring tube for at least one of receiving the fluid or conducting the flow of the fluid through the measuring tube in a flow direction, the measuring tube having a flow cross section, side walls including one side wall, an opposite side wall located opposite said one side wall, a further side wall, and a further opposite side wall located opposite said further side wall;
 providing first and second oscillation transducers disposed at a distance from one another on the measuring tube;
 at least one wall selected from the group consisting of the further side wall and the further opposite side wall having at least one recess extending in the flow direction and increasing the flow cross section of the measuring tube, wherein the measuring tube has a rectangular flow cross section apart from the at least one recess at least in at least one measurement section located between the first and second oscillation transducers;
 the one side wall and the opposite side wall having inner faces spanning a main flow volume;
 the first and second oscillation transducers both being disposed on the one side wall or one of the first and second oscillation transducers being disposed on the one side wall and another one of the first and second oscillation transducers being disposed on the opposite side wall;
 the at least one recess being located outside the main flow volume and forming a respective secondary flow volume; and
 the at least one recess being provided only in at least one wall selected from the group consisting of the further side wall on which none of the oscillation transducers is disposed and the further opposite side wall on which none of the oscillation transducers is disposed;
 using a control device to drive at least one of the oscillation transducers to excite a wave being conducted through at least one of the side walls of the measuring tube and using the conducted wave to excite compression oscillations of the fluid to be conducted through the fluid to a further of the oscillation transducers;
 using the control device to record the compression oscillations at the further oscillation transducer to determine measurement data; and
 using the control device to determine the fluid variable as a function of the measurement data.

* * * * *